United States Patent Office 3,667,897
Patented June 6, 1972

---

3,667,897
UNIFORMLY DYED YELLOW TO NAVY BLUE WATER SWELLABLE CELLULOSIC FIBERS
John Blackwell, Kennett Square, Pa., and Masuo Toji, Stratford, N.J., assignors to E. I. du Pont de Nemours and Company, Wilmington, Del.
No Drawing. Filed Nov. 25, 1969, Ser. No. 879,899
Int. Cl. D06p 3/82
U.S. Cl. 8—21 C          5 Claims

---

ABSTRACT OF THE DISCLOSURE

Water swellable cellulosic fibers, for example, cotton, or blends or mixtures thereof with synthetic fibers, for example, polyester fibers, uniformly dyed to yellow to navy blue shades with essentially water insoluble, monoazo or disazo disperse dyes, for example, 2-chloro-4-nitro-4'-[N,N-bis(benzoyloxyethyl)amino]azobenzene, said dyed fibers being fast to washing, drycleaning and crocking and having a reflectance color value (S') after scour of at least about 2.

---

BACKGROUND OF THE INVENTION

(1) Field of the invention

This invention relates to dyed water swellable cellulosic fibers and to dyed blends or mixtures of water swellable cellulosic fibers and synthetic fibers.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellluosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for cellulosic and for synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. 3,313,590. Analogous to the dyeing of such blends and confirming the aforesaid distinction between water swellable cellulosic materials and non-swellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other silimar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penerated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913, issued Jan. 25, 1944, to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in commonly assigned U.S. application Ser. No. 778,809, filed Nov. 25, 1968, now abandoned in favor of continuation-in-part application Ser. No. 122,227, filed Mar. 8, 1971, disclose a process for dyeing water swellable cellulosic materials with disperse dyes, which process comprises contacting a water swellable cellulosic material in any sequence with the following:

(1) Water in an amount sufficient to swell the cellulose;
(2) A dye in an amount sufficient to color the cellulose, a boiling saturated solution of which dye in 0.1 molar aqueous sodium carbonate exhibits an optical absorbance not in excess of about 30; and
(3) A solvent in an amount sufficient to maintain swelling of the cellulose if water is removed, and which (a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula $$R(O-CH-CH_2)_m R^1$$
$$\quad\quad\quad | $$
$$\quad\quad\quad C_nH_{2n+1}$$

$$[R(O-CH-CH_2)_mO]_x A$$
$$\quad\quad\quad | $$
$$\quad\quad\quad C_nH_{2n+1}$$

wherein $n$ is 0 or 1; $m$ is a positive whole number; R is H, $C_{1-8}$ alkyl, $C_{7-15}$ aralkyl or alkaryl, $$R^2C-, R^2SO_2-, \text{ or } R^2OC-$$
$$\;\;\|\quad\quad\;\;\|\quad\quad\quad\quad\;\;\|$$
$$\;\;O\quad\quad\;\;O\quad\quad\quad\quad\;\;O$$

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl; $R^1$ is —OH, —$OR^2$, —$SR^2$, —$NHR^2$, —$NR^2$ ($C_{1-8}$ alkyl), —$NR^2(C_{7-15}$ aralkyl or alkaryl), $$-OCR^2, -OSO_2R^2, -OCOR^2$$
$$\;\;\|\quad\quad\quad\quad\quad\quad\;\;\|$$
$$\;\;O\quad\quad\quad\quad\quad\quad\;\;O$$

—NH(phenyl), or —NH(naphthyl), wherein $R^2$ is as defined above;

$x$ is the number of unsatisfied valencies in A; and A is $ROCH_2CHORCH_2-$, —$CH_2CHORCH_2-$, $$-CH_2CHCH_2-$$
$$\quad\quad |$$

—$CH_2C(CH_2OR)_3$, (—$CH_2)_2C(CH_2OR)_2$,
(—$CH_2)_3CCH_2OR$, (—$CH_2)_4C$,
—$CH_2(CHOR)_yCH_2OR$, (—$CH_2)(CHOR)_yCH_2$, or
—$CH_2(CHOR)_{y-z}$(—$CH)_zCH_2-$ in which $y$ is 2, 3 or 4 and $z$ is 0, 1, 2, 3, or 4 but no greater than $y$, and wherein R is as defined above; provided that at some stage during the process the interior of the swollen cellulose is contacted with a solution of the dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

Conventional vat and disperse dyes can be used in the Blackwell et al. process, but most such dyes are unsatisfactory in commercial operations. The vat dyes usually provide only surface staining because they lack sufficient solubility in the Blackwell et al. solvents and do not penetrate the fiber. Such surface stains can be largely removed by aqueous detergent or drycleaning scour. The conventional disperse dyes, on the other hand, although they may penetrate the fiber, are sufficiently soluble in hot alkali to be removed during aqueous detergent scour.

OBJECTS AND SUMMARY OF THE INVENTION

It is an object of this invention to provide uniformly dyed fibers. A further object is to provide uniformly dyed water swellable cellulosic fibers and uniformly dyed blends or mixtures of water swellable cellulosic fibers and synthetic fibers. Still another object is to provide deep yellow to navy blue uniformly dyed fibers which are fast to washing, drycleaning and crocking. Another object is to provide fibers which have been uniformly dyed with essentially water insoluble, monoazo or disazo disperse dyes.

The present invention resides in uniformly dyed, yellow to navy blue, water swellable cellulosic fibers or blends or mixtures of water swellable cellulosic fibers and synthetic fibers, said dyed fibers being fast to washing, drycleaning and crocking and having a reflectance color value (S') of at least about 2 after one thorough scour in aqueous detergent at 90–100° C. and one thorough scour in perchloroethylene at 50° C., and wherein said fibers the dye comprises the monoazo or disazo disperse dye having the formula $$Z_2 - \underset{Z_3\;\;Z_4}{\overset{Z_1}{\bigcirc}} - \left[ -N=N- \underset{Y_1\;\;Y_2}{\overset{Y_3}{\bigcirc}} - \right]_n -N=N- \underset{X_1\;\;X_2}{\overset{X_3}{\bigcirc}} -N\underset{R_1}{\overset{R}{\diagdown}}$$

wherein

R is H, $R_2$ benzyl, $$C_2H_4OCR_2,\; C_2H_4OCR_3,\; C_2H_4OCOR_2,\; C_2H_4OCOR_3,\; C_2H_4CN$$
$$\quad\;\;\|\quad\quad\quad\;\;\|\quad\quad\quad\quad\;\;\|\quad\quad\quad\quad\;\;\|$$
$$\quad\;\;O\quad\quad\quad\;\;O\quad\quad\quad\quad\;\;O\quad\quad\quad\quad\;\;O$$

$$C_2H_4CNH_2,\; C_2H_4CNHR_3,\; C_2H_4CNHR_2,\; C_2H_4CN(R_2)_3$$
$$\quad\;\;\|\quad\quad\quad\quad\;\;\|\quad\quad\quad\quad\;\;\|\quad\quad\quad\quad\;\;\|$$
$$\quad\;\;O\quad\quad\quad\quad\;\;O\quad\quad\quad\quad\;\;O\quad\quad\quad\quad\;\;O$$

$$C_2H_4CN(R_2)R_3,\; C_2H_4COR_2,\; C_2H_4COR_3$$
$$\quad\;\;\|\quad\quad\quad\quad\quad\;\;\|\quad\quad\quad\;\;\|$$
$$\quad\;\;O\quad\quad\quad\quad\quad\;\;O\quad\quad\quad\;\;O$$

$C_2H_4OR_2$ or $C_2H_4OR_3$;

$R_1$ is phenyl or any member of the group recited for R;

$X_1$ and $X_2$ jointly are —CH=CH—CH=CH— or

—CH=CH—CH=CH— which has been substituted with $R_2$, $OR_2$, Cl, Br or $SO_2N(R_2)_2$, or $X_1$ is H, Cl, $R_2$, $$NHCR_2,\; NHCR_3,\; NHCOR_2,\; NHC(CH_2)_mOR_2,\; NHC(CH_2)_mOR_3$$
$$\;\;\|\quad\quad\;\;\|\quad\quad\quad\;\;\|\quad\quad\quad\quad\quad\;\;\|\quad\quad\quad\quad\quad\;\;\|$$
$$\;\;O\quad\quad\;\;O\quad\quad\quad\;\;O\quad\quad\quad\quad\quad\;\;O\quad\quad\quad\quad\quad\;\;O$$

$OR_2$ or $SR_2$, and $X_2$ is H, $R_2$, $OR_2$, $SR_2$ or Cl;

$X_3$ is any member of the group recited for $X_2$;

$Z_1$ is H, $R_2$, $NO_2$, Cl, Br, CN, $SO_2N(R_2)_2$,

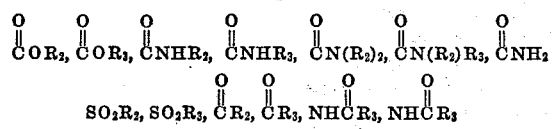

OR$_2$, OR$_3$, SR$_2$ or CF$_3$;
Z$_2$ is any member of the group recited for Z$_1$;
Z$_3$ and Z$_4$ jointly are —CH=CH—CH=CH— or

—CH=CH—CH=CH— which has been substituted with R$_2$, OR$_2$, Cl, Br or SO$_2$N(R$_2$)$_2$, or
Z$_3$ is any member of the group recited for Z$_1$, and Z$_4$ is any member of the group recited for Z$_1$;
Y$_1$ and Y$_2$ jointly are —CH=CH—CH=CH—, subject to the proviso that when Z$_1$, Z$_2$, Z$_3$ or Z$_4$ is NO$_2$ and R and R$_1$ are R$_2$, then X$_1$ is not R$_2$, and when Z$_1$, Z$_2$, Z$_3$ or Z$_4$ is NO$_2$ and X$_1$ is

or

then R is H, R$_2$ or C$_2$H$_4$CN and R$_1$ is H, R$_2$, C$_2$H$_4$CN or phenyl, or
Y$_1$ is H, CH$_3$, C$_2$H$_5$, OCH$_3$, OC$_2$H$_5$, SCH$_3$, SC$_2$H$_5$ or Cl; and
Y$_2$ is any member of the group recited for Y$_1$;
Y$_3$ is any member of the group recited for Y$_1$;
R$_2$ is C$_{1-8}$ alkyl;
R$_3$ is phenyl or phenyl with 1-2 substituents selected from C$_{1-4}$ alkyl, C$_{1-4}$ alkoxy, NO$_2$ and Cl;
n is 0 or 1;
m is 1 or 2;
subject to the proviso that when R and R$_1$ are

and n is 1, then at least one of Z$_1$, Z$_2$, Z$_3$ and Z$_4$ is NO$_2$, and subject to the further proviso that there are present at least four aromatic rings (every ring is counted; for example, a naphthylene group contains two rings).

DETAILED DESCRIPTION OF THE INVENTION

The above-defined, essentially water insoluble, mono- or disazo dyes which are used in the preparation of the dyed fibers of this invention are prepared by procedures well known in the art. In summary, the monoazo dyes are prepared by diazotizing an amine having the formula

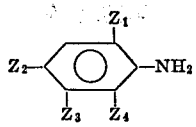

and then coupling the diazo to a second amine having the formula

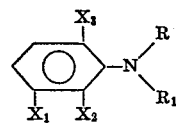

The disazo dyes are prepared by coupling the aforesaid diazo to an amine having the formula

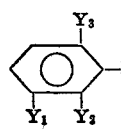

and then diazotizing the intermediate azoamine and coupling the azodiazo to an amine having the formula

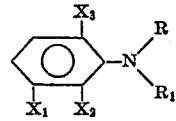

In the above formulas for the amines, the symbols are as previously defined, including the provisos.

As already indicated, the methods used to prepare the dyes are familiar to those skilled in the art. Diazotization of many aromatic amines can be carried out in cold, aqueous hydrochloric acid; others may require nitrosylsulfuric acid in order to form the dinazonium salt. Similarly, the conditions under which the coupling of a diazo compound to an aromatic amine is effectively carried out varies in ways well known in the art. Some couplers can simply be dissolved in aqueous mineral acid and the diazo added thereto; others must be first dissolved in an aqueous organic or an organic solvent before coupling can be effected. Acetic acid and acetic-propionic acid mixtures are particularly useful in this respect.

In preparing the disazo dyes, the monoazo intermediates are conveniently diazotized in aqueous propionic or acetic acid, or mixtures thereof, by adding hydrochloric acid and sodium nitrite at ambient temperatures or above. The couplers are dissolved in a suitable solvent (for example, aqueous hydrochloric acid, aqueous acetic acid, acetic acid or acetone) and the disazo dye is prepared by adding the diazo preparation to the coupler, or vice versa. It is often desirable to raise the pH during coupling in order to increase the rate of reaction. This is done by adding a suitable salt or base, such as sodium acetate or sodium hydroxide. The resulting dyes are isolated by filtration and purified if necessary by washing or reslurrying or by recrystallizing from a suitable solvent system. Finally, the dye is milled in the presence of a dispersing agent, such as a sodium lignosulfonate, until a particle size of about 1 micron is obtained.

Monoazo dyes that are most useful for coloring cellulosic fibers can be obtained by coupling aromatic amines, such as those given in Tables 1 and 2 (and obvious equivalents of these), to aromatic amines containing two or three aromatic substitutents, such as those given in Tables 10 to 13. Many of the simpler amines of Tables 1 and 2 can be diazotized in cold hydrochloric acid by adding a slight molar excess of sodium nitrite. The more highly substituted amines, however, require nitrosylsulfuric acid as the diazotizing agent. Other monoazo dyes can be prepared by coupling an amine from Tables 3 and 4 (or an obvious equivalent thereof) to an amine from Tables 8 to 13.

The diazo dyes which are used in this invention can be obtained by conventional diazotization and coupling reactions using any of the amines listed in Tables 1 to 13 according to the sequences shown below:

| Table number, starting amine | Table number, middle amine | Table number, final amine |
|---|---|---|
| 1 → | 5 → | 8–11 |
| 1 → | * → | 6–11 |
| 2 → | 5 → | 8–13 |
| 2 → | * → | 6, 8, 10, 11 |
| 3 → | 5 → | 6–11 |
| 3 → | * → | 6–11 |
| 4 → | 5 → | 6–13 |
| 4 → | * → | 6, 8, 10, 12 |

*α-naphthylamine or derivative.

In the following Tables 6 to 13, the symbols correspond to those previously given.

TABLE 1 aniline
o-, m- or p-toluidine
p-butylaniline
o-, m- or p-chloroaniline
o-, m- or p-bromoaniline
o-chloro-p-toluidine
3-chloro-4-cyanoaniline
o-, m- or p-anisidine
o- or p-cyanoaniline
2,4-dicyanoaniline
o-chloro-p-cyanoaniline
2,4-dichloroaniline
2,4-dibromoaniline
o-aminobenzotrifluoride
2-amino-5-chlorobenzotrifluoride
2-chloro-4-aminopropionanilide
5-chloro-2-dimethylsulfamylaniline
4-chloro-2-anisidine
5-bromo-2-anisidine
2-methoxy-5-methylaniline
4-amino-3-chlorobenzotrifluoride
5-amino-2-bromobenzotrifluoride
butyl anthranilate
methyl-4-chloroanthranilate
p-aminobenzoic acid, octyl ester
p-aminoacetophenone
p-octylsulfonylaniline
p-aminobenzoic acid, butylamide
3-amino-5-chlorobenzamide
N-octyl anthranilamide
o-thioethylaniline
3-caprylamidoaniline
o-ethylsulfonylaniline
p-butoxyaniline
o-phenetidine
2,5-dichloroaniline
2,5-dibromoaniline
5-chloro-2-cyanoaniline
2-chloro-5-dibutylsulfamylaniline
xylidines
2,5-dicyanoaniline

TABLE 2

2-chloro-5-nitroaniline
5-nitro-2-toluidine
o-, m- or p-nitroaniline
o-chloro-p-nitroaniline
o-bromo-p-nitroaniline
o-cyano-p-nitroaniline
2,4-dinitroaniline
o-nitro-p-anisidine
p-nitro-o-anisidine
o-nitro-p-octyloxyaniline
2,6-dichloro-4-nitroaniline
2-chloro-6-cyano-4-nitroaniline
2,6-dibromo-4-nitroaniline
2-bromo-4,6-dinitroaniline
2-chloro-4,6-dinitroaniline
2-cyano-4,6-dinitroaniline
2-bromo-6-cyano-4-nitroaniline
2-amino-3,5-dinitrobenzotrifluoride
2,4,6-trinitroaniline
2,5-dichloro-4,6-dinitroaniline
2,5-dichloro-4-nitroaniline
2,4-dinitro-6-amylsulfonylaniline
2-amino-3,5-dinitrobenzoic acid, butyl ester
2,5-dibromo-4,6-dinitroaniline
2,6-dicyano-4-nitroaniline
2-amino-5-nitrobenzoic acid, propyl ester
4-amino-3-nitrobenzoic acid, diethylamide
5-nitro-2-anisidine
2-amino-4-nitrobenzoic acid, dimethylamide
o-nitro-p-toluidine
p-nitro-o-toluidine
3-chloro-4-cyanoaniline
4-bromo-2,6-dinitroaniline
4-chloro-2,6-dinitroaniline
3-amino-2-bromo-4,6-dinitrotoluene
3-amino-4-bromo-2,6-dinitrotoluene
3-amino-2-chloro-4,6-dinitrotoluene
3-amino-4-chloro-2,6-dinitrotoluene
3-amino-2,4,6-trinitrotoluene
5-chloro-2-cyano-4-nitroaniline
2,5-dichloro-4-nitroaniline
2-cyano-4,5,6-trichloroaniline

TABLE 3 phenyl anthranilate
p-phenylsulfonylaniline
p-aminobenzophenone
p-aminobenzanilide
4-amino-4'-methylbenzanilide
3'-amino-4-t.-butylbenzanilide
4-amino-3-bromobenzophenone
4-aminobenzoic acid, p-t.-butylphenyl ester
4'-amino-2'-chlorobenzanilide
p-aminobenzoic acid, N-methylanilide
p-phenoxyaniline
2,3-diethyl-4-phenylsulfonylaniline
2,5-dimethoxy-4-phenylsulfonylaniline
2,6-dibromo-4-(p-tolylsulfonyl)aniline
4-amino-3,5-dichlorobenzoic acid, p-t.-butylphenyl ester
α-naphthylamine
1-amino-5-naphthalenesulfonic acid, diethylamide
1-amino-2-ethoxy-6-naphthalenesulfonic acid, dibutylamide
1-amino-5-butoxy-7-naphthalenesulfonic acid, dioctylamide
5-bromo(or chloro)-1-naphthylamine
7-ethyl-1-naphthylamine
2-amino-4,5-dichlorobenzophenone
2'-amino-2,4-dimethylbenzophenone
4'-amino-2,4-dichlorobenzophenone
4-amino-4'-propoxybenzophenone
2-chloro-6-phenylsulfonylamine
3'-amino-4'-chloro-2,4-dimethyl benzophenone
p-(2-methoxy-4-nitrophenylsulfonyl)aniline

TABLE 4

2-amino-3,5-dinitrobenzoic acid, phenyl ester
2,4-dinitro-6-phenylsulfonylaniline
2-amino-3,5-dinitrobenzophenone
2-amino-4,5-dimethyl-4'-nitrobenzophenone
2-nitro-4-(p-tolylsulfonyl)aniline

TABLE 5 aniline
o-toluidine
o-ethylaniline
m-toluidine
m-ethylaniline
2-methoxy-5-methylaniline
2,5-dimethoxyaniline
o-phenetidine
m-phenetidine
o-anisidine
m-anisidine
2,5-xylidine
2,6-xylidine
o-thioanisidine
o-thiophenetidine
o-chloroaniline
5-chloro-o-toluidine
5-chloro-o-anisidine
m-chloroaniline

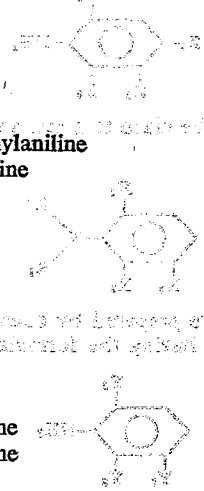

TABLE 6

| X₁ | X₂ | X₃ | R | R₁ |
|---|---|---|---|---|
| H | H | H | H | CH₃ |
| H | H | H | H | C₈H₁₇ |
| H | H | H | C₄H₉ | C₄H₉ |
| H | CH₃ | CH₃ | C₃H₇ | C₃H₇ |
| H | H | H | SC₂H₅ | C₂H₅ |
| OCH₃ | H | OCH₃ | C₄H₉ | C₄H₉ |
| NHCOCH₃ | H | H | C₂H₅ | C₂H₅ |
| H | H | H | C₂H₅ | C₂H₄CN |
| H | H | H | C₂H₄CN | C₂H₄CN |
| CH₃ | H | CH₃ | C₂H₄CN | C₂H₄CN |
| NHCOC₈H₁₇ | H | H | C₂H₄CN | C₂H₄CN |
| H | H | H | C₂H₄CN | C₂H₄OCOCH₃ |
| H | H | H | C₂H₄CN | C₂H₄OCOC₈H₁₇ |
| H | H | H | C₂H₄CN | C₂H₄OCOC₂H₅ |
| OCH₃ | H | H | C₂H₄CN | C₂H₄OCOC₃H₇ |
| CH₃ | H | OCH₃ | C₂H₄CN | C₂H₄OCOCH₃ |
| H | H | H | C₂H₄OCOCH₃ | C₂H₄OCOCH₃ |
| H | H | H | C₂H₄OCOC₈H₁₇ | C₂H₄OCOC₈H₁₇ |
| H | CH₃ | CH₃ | C₂H₄OCOC₂H₅ | C₂H₄OCOC₂H₅ |
| CH₃ | H | OCH₃ | C₂H₄OCOCH₃ | C₂H₄OCOCH₃ |
| OCH₃ | H | OCH₃ | C₂H₄OCOC₃H₇ | C₂H₄OCOC₃H₇ |
| H | H | H | C₂H₄CONH₂ | C₂H₄CONH₂ |
| CH₃ | H | CH₃ | C₂H₄CON(C₂H₅)₂ | C₂H₄CON(C₂H₅)₂ |
| H | H | Cl | C₂H₄OCOCH₃ | C₂H₄OCOCH₃ |

TABLE 7

| X₁ | X₂ | X₃ | R | R₁ |
|---|---|---|---|---|
| CH₃ | H | H | C₈H₁₇ | C₈H₁₇ |
| CH₃ | H | OCH₃ | CH₃ | CH₃ |
| NHCOC₈H₁₇ | H | H | C₂H₄CN | C₂H₄OCOCH₃ |
| NHCOCH₃ | H | H | C₂H₄OCOCH₃ | C₂H₄OCOCH₃ |
| NHCOC₃H₇ | H | OC₂H₅ | C₂H₄OCOCH₃ | C₂H₄OCOCH₃ |
| NHCOCH₃ | H | H | C₂H₄CONHC₈H₁₇ | C₂H₄CONHC₈H₁₇ |
| NHCOOC₂H₅ | H | H | C₂H₄OCOCH₃ | C₂H₄OCOCH₃ |
| NHCOCH₂OCH₃ | H | H | C₂H₄OCOCH₃ | C₂H₄OCOCH₃ |

TABLE 8

| X₁ | X₂ | X₃ | R | R₁ |
|---|---|---|---|---|
| H | H | H | H | C₆H₅ |
| CH₃ | H | H | H | C₆H₅ |
| H | CH₃ | CH₃ | H | C₆H₅ |
| OCH₃ | H | OCH₃ | H | C₆H₅ |
| NHCOC₈H₁₇ | H | H | H | C₆H₅ |
| NHCOC₃H₇ | H | OCH₃ | H | C₆H₅ |
| H | H | H | C₂H₅ | C₆H₅ |
| CH₃ | H | H | CH₃ | C₆H₅ |
| CH₃ | CH₃ | CH₃ | CH₃ | C₆H₅ |
| CH₃ | H | OCH₃ | CH₃ | C₆H₅ |
| NHCOCH₃ | H | H | C₃H₇ | C₆H₅ |
| H | H | H | C₂H₄CN | C₆H₅ |
| CH₃ | H | H | C₂H₄CN | C₆H₅ |
| NHCOC₂H₅ | H | H | C₂H₄CN | C₆H₅ |
| NHCO—⟨C₆H₄⟩—OCH₃ | H | H | C₂H₅ | C₂H₅ |
| H | H | H | C₂H₄CN | C₂H₄OCO—⟨C₆H₃(OCH₃)⟩—OCH₃ |
| NHCOC₆H₅ | H | OCH₃ | C₄H₉ | C₄H₉ |
| OCH₃ | H | OCH₃ | C₂H₄CN | C₂H₄OCOCH₃ |
| H | H | H | C₂H₅ | C₂H₄OCOOC₆H₅ |
| C₂H₅ | H | H | C₂H₄CN | C₂H₄CONHC₆H₅ |
| H | H | H | C₂H₅ | C₂H₄COOC₆H₅ |
| CH₃ | H | H | C₂H₅ | C₂H₄COOC₆H₅ |
| H | H | H | C₂H₅ | C₂H₄COOC₆H₅ |
| CH₃ | H | H | C₂H₄CN | C₂H₄COOC₆H₅ |
| (—CH=CH—CH=CH—) | | | H | C₈H₁₇ |

TABLE 9

| X₁ | X₂ | X₃ | R | R₁ |
|---|---|---|---|---|
| NHCOC₆H₅ | H | H | C₂H₄CN | C₂H₄OCOCH₃ |
| NHCOC₆H₅ | H | OCH₃ | C₂H₄CN | C₂H₄OCOCH₃ |
| NHCO—⟨C₆H₄⟩—CH₃ | H | H | C₂H₄OCOCH₃ | C₂H₄OCOCH₃ |
| NHCOC₆H₅ | H | OCH₃ | C₂H₄OCOC₃H₇ | C₂H₄OCOC₃H₇ |
| NHCO—⟨C₆H₄⟩—Cl | H | H | C₂H₅ | C₂H₄OCOC₈H₁₇ |
| NHCOCH₃ | H | OCH₃ | C₂H₄CN | C₂H₄OCOC₆H₅ |
| NHCOC₆H₅ | H | H | C₂H₄CONHC₆H₅ | C₂H₄CONHC₆H₅ |
| NHCO—⟨C₆H₃(CH₃)⟩—CH₃ | H | H | C₂H₄OCOOC₈H₁₇ | C₂H₄OCOOC₈H₁₇ |
| NHCO—⟨C₆H₄⟩—OC₄H₉ | H | H | C₂H₄COOCH₃ | C₂H₄COOCH₃ |
| NHCOC₆H₅ | H | OCH₃ | C₂H₄CN | C₂H₄COOC₆H₅ |
| NHCOC₆H₅ | H | H | C₂H₄CN | C₂H₄CON(CH₃)₂ |
| NHCOC₄H₉ | H | OCH₃ | C₂H₄CN | C₂H₄COOC₆H₅ |
| NHCOCH₂OC₆H₅ | H | H | C₂H₄OCOCH₃ | C₂H₄OCOCH₃ |

TABLE 10

| X₁ | X₂ | X₃ | R | R₁ |
|---|---|---|---|---|
| NHCOC₆H₅ | H | H | H | C₆H₅ |
| NHCO—C₆H₃(OCH₃)(OCH₃) | H | H | C₂H₅ | C₆H₅ |
| NHCOC₆H₅ | H | OCH₃ | CH₃ | C₆H₅ |
| H | H | H | C₂H₄OCO—C₆H₄—CH₃ | C₂H₄OCO—C₆H₄—CH₃ |
| H | H | H | C₂H₄CO₂C₆H₅ | C₂H₄CO₂C₆H₅ |
| H | H | H | C₂H₄CONH—C₆H₄—CH₃ | C₂H₄CONH—C₆H₄—CH₃ |
| (—CH=CH—CH=CH—) | H | H | H | C₆H₅ |
| (—CH=CH—CH=CH—) | H | H | H | C₂H₄OCOC₆H₅ |
| H | H | H | C₂H₄OC₆H₅ | C₂H₄OC₆H₅ |
| H | H | H | C₂H₄CON(CH₃)C₆H₅ | C₂H₄CON(CH₃)C₆H₅ |

TABLE 11

| X₁ | X₂ | X₃ | R | R₁ |
|---|---|---|---|---|
| NHCO—C₆H₄—t.C₄H₉ | H | H | C₂H₄CN | C₂H₄OCOC₆H₅ |
| NHCOC₆H₅ | H | OCH₃ | C₂H₄CN | C₂H₄OCOC₆H₅ |
| NHCOC₆H₅ | H | H | C₂H₄CN | C₂H₄OCO₂C₆H₅ |
| NHCOC₆H₅ | H | OCH₃ | C₂H₅ | C₂H₄OCO₂C₆H₅ |
| NHCO—C₆H₄—Cl | H | H | C₂H₄CN | C₂H₄CO₂—C₆H₄—C₄H₉ |
| NHCOC₆H₅ | H | H | C₃H₇ | C₂H₄CO₂C₆H₅ |
| NHCO—C₆H₄—Cl | H | OCH₃ | CH₃ | C₂H₄CO₂C₆H₅ |
| NHCOC₆H₅ | H | H | C₂H₄CN | C₂H₄CONHC₆H₅ |
| NHCOC₆H₅ | H | OCH₃ | C₃H₅ | C₂H₄CONH—C₆H₃Cl₂ |
| NHCO—C₆H₄—CH₃ | H | H | C₂H₄OCO₂C₆H₅ | C₂H₄OCO₂C₆H₅ |
| NHCOC₆H₅ | H | OCH₃ | C₂H₄OCO₂C₆H₅ | C₂H₄OCO₂C₆H₅ |
| NHCO—C₆H₄—NO₂ | H | H | C₂H₄COOC₆H₅ | C₂H₄COOC₆H₅ |
| NHCOC₆H₅ | H | OCH₃ | C₂H₄COO—C₆H₃(OCH₃)(OCH₃) | C₂H₄COO—C₆H₃(OCH₃)(OCH₃) |
| NHCO—C₆H₄—Cl | H | H | C₂H₄CONH—C₆H₄—C₄H₉ | C₂H₄CONH—C₆H₄—C₄H₉ |
| NHCOC₆H₅ | H | OCH₃ | C₂H₄CONH—C₆H₄—Br | C₂H₄CONH—C₆H₄—Br |

TABLE 12

| X₁ | X₂ | X₃ | R | R₁ |
|---|---|---|---|---|
| H | H | H | C₂H₄OCOC₆H₅ | C₂H₄OCOC₆H₅ |
| H | H | SCH₃ | C₂H₄OCOC₆H₅ | C₂H₄OCOC₆H₅ |
| OCH₃ | H | H | C₂H₄OCOC₆H₅ | C₂H₄OCOC₆H₅ |
| CH₃ | CH₃ | H | C₂H₄OCOC₆H₅ | C₂H₄OCOC₆H₅ |
| Cl | H | H | C₂H₄OCOC₆H₅ | C₂H₄OCOC₆H₅ |
| SCH₃ | H | H | C₂H₄OCOC₆H₅ | C₂H₄OCOC₆H₅ |

TABLE 13

| X₁ | X₂ | X₃ | R | R₁ |
|---|---|---|---|---|
| NHCOCH₃ | H | H | C₂H₄OCOC₆H₅ | C₂H₄OCOC₆H₅ |
| NHCOC₃H₇ | H | OCH₃ | C₂H₄OCO—C₆H₄—Cl | C₂H₄OCO—C₆H₄—Cl |
| NHCOC₆H₅ | H | H | C₂H₄OCOC₆H₅ | C₂H₄OCOC₆H₅ |
| NHCOC₆H₅ | H | OCH₃ | C₂H₄OCO—C₆H₃(OCH₃)(OCH₃) | C₂H₄OCO—C₆H₃(OCH₃)(OCH₃) |

The cellulosic materials which can be dyed with the aforesaid dyes by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with 10% aqueous caustic or the dyeing can be carried out in the presence of wetting agents, preferably of the nonionic type. Mixtures of cotton and rayon fibers can be dyed, and the dyes also can be used to dye purified wood pulp and paper. Excluded herein as the water swellable cellulosic material is cellulose acetate which does not exhibit the requisite swellability in the presence of water.

The synthetic materials which can be dyed with the aforesaid dyes include polyesters, polyamides, cellulose ethers and esters, and copolymers and mixtures thereof with other components intended to make them more easily dyeable or to add other desirable properties. The dyes can be applied to synthetic materials by conventional procedures, such as the Thermosol or aqueous dyeing procedures.

The dyes can be applied to water swellable cellulosic materials, or to blends or mixtures thereof with synthetic materials by the above-described Blackwell et al. process. The dyes are particularly useful for dyeing mixtures and blends of cotton and polyester or polyamide, such as mixtures containing 65 to 80% polyethylene terephthalate and 20 to 35% cotton. In such mixtures, the synthetic material is dyed using conventional process conditions. Since the aforesaid dyes can be used to dye both components in a blend or mixture, scourability as a factor in dye selection need not be considered since the cross-staining problem (requiring scouring) often encountered in prior art processes employing two different types of dyes has been minimized.

The dyes used herein dye the substrate directly, that is, they do not require oxidation, reduction, hydrolysis, or any other chemical modification for development of color or fastness. The dyes exhibit excellent fastness to crocking, washing and drycleaning.

In dyeing cellulosic materials using the Blackwell et al. process, water, dye and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dye baths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dye baths used in practicing this invention also can contain dyes other than those described above; for example, direct dyes or fiber reactive dyes for cotton or for polyamides can be present for shading purposes.

In the preferred dyeing procedure herein, an aqueous dye dispersion and the organic solvent are applied to the fabric from a single padbath. The amount of water in the padbath usually is 70–95% weight percent and the solvent, 5–30 weight percent. The padded fabric is heated at 180–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

As a quantitative measure of the shades obtainable on the fiber after scour, it is convenient to consider reflectance color value (S), as defined in British Pat. 1,056,-358. The reflectance color value is given by the equation $$S = (L + M + N)$$

where L, M and N replace the well-known standard colorimetric values X, Y and Z set up by the CIE (Commission Internationale d'Eclairage). Whereas $$X, Y, Z = \int R\lambda E\lambda (\tilde{x}, \tilde{y}, \tilde{z}) d\lambda \quad (I)$$

(where $R\lambda$=reflectance characteristic of the wave length; $E\lambda$=radiation function of the illuminant; and $\tilde{x}$, $\tilde{y}$ and $\tilde{z}$=CIE distribution coefficients which characterize a particular color), $$L, M, N = \frac{1}{K_o} \int F\lambda E\lambda (\tilde{x}, \tilde{y}, \tilde{z}) d\lambda \quad (II)$$

(where $K_o$=dyestuff concentration and $$F\lambda = \frac{(1 - R\lambda)^2}{2(1 - r)(R\lambda - r)}$$

where $R\lambda$ is defined above and $r$=residual surface reflectance of the substrate when dyed completely black).

The sum of $(L+M+N)$, as the terms are defined in Equation II, is a constant for a given dye and independent of the concentration of dye on the substrate. In order to obtain values for $(L+M+N)$ which are proportional to the shade depth of the dyed fabric, the concentration term $1/K_o$ has been removed from Equation II; since it is desirable to obtain numbers in the 0–25 range, the values of the summation $(L+M+N)$ have been further modified by dividing by 100. This new summation, as used herein and represented by S', is related to S as defined in British Pat. 1,056,358 by the equation $$S' = \frac{K_o}{100} \times S$$

where $K_o$ is as defined above.

A reflectance color value (S') of 2 represents a light but useful shade, that is, a dyeing rather than a mere staining of the fibers. It has been found that such shade depths are easily obtained on cotton with the dyes herein and, by increasing the concentration of dye in the padbath, shade depths of 10 times this figure can be achieved readily.

The dyes used in the present invention cannot be applied to cotton as vat dyes. In other words, they cannot be reduced to a water-soluble form, which has affinity for cotton from an aqueous solution, and then insolubilized within the cotton fibers by an oxidation step.

The following examples illustrate typical preparative procedures for the dyes used herein. Parts are given by weight.

EXAMPLE 1

Preparation of 2,6-dichloro-4-nitroaniline→N-(3-benzamidophenyl)diethanolamine dibenzoate 8.4 parts of powdered sodium nitrite were added in small portions to 160 parts of 98% sulfuric acid at 25–30° C. The mixture was then heated carefully to 70° C. and held at this temperature until the solid had dissolved. The solution was cooled to 20° C. and 20.7 parts of 2,6-dichloro-4-nitroaniline were added. The reaction mixture was stirred at 25–30° C. for 1 hour. The resulting diazo preparation was then added to a solution of 50 parts of N-(3-benzamidophenyl)diethanolamine dibenzoate in 400 parts of acetone and 11.6 parts of 10 N-hydrochloric acid at 15–20° C. The pH was adjusted to 2.7 with sodium acetate trihydrate and the reaction mass was stirred overnight. The product was isolated by filtration. The solids were reslurried in 500 parts of 50% aqueous acetone, and then in water, and dried; yield, 59 parts.

*Analysis.*—Calc'd for $C_{37}H_{29}O_7N_5Cl_2$ (percent): C, 61.2; H, 4.0; N, 9.64. Found (percent): C, 60.8; 60.9; H, 4.0, 4.0; N, 9.7, 9.6. Based on the above, the dye has the structure corresponding to 2,6-dichloro-4-nitro-2'-(N-benzoylamino) - 4' - [N,N-bis(benzoyloxyethyl)amino] azobenzene. It has an absorptivity of 33.5 l./gram/cm. at 480 m$\mu$ (in dimethyacetamide:water=4:1). Deep brownish rubine shades are produced when cotton or cotton-polyester blends are dyed or printed with this dye by the methods illustrated in Examples 4 and 5.

EXAMPLE 2

Preparation of aniline→aniline→m-benzamido-N,N-dibenzylaniline dibenzoate 294 parts of 10 N-hydrochloric acid were added slowly, with stirring, to 233 parts of aniline. Ice was added to cool the mass to 0° C. and 69 parts of powdered sodium nitrite were added rapidly. The temperature of the reaction mixture was held at 5° C. for ½ hour by external cooling, and then allowed to rise to room temperature. After stirring the reaction mass at room temperature for 12 hours, the temperature was raised to and held at 30° C. for 4 hours, and then to and held at 40° C. for 4 hours. Sufficient 10 N-hydrochloric acid was then added to give a strongly acidic reaction on Congo Red paper; the reaction mass was then stirred for 1 hour. The phenylazoaniline hydrochloride was isolated by filtration and washed thoroughly with 1 N-hydrochloric acid to remove excess aniline; yield, 75% (based on the sodium nitrite added).

10 parts of phenylazoaniline hydrochloride, 90 parts of acetic acid, 25 parts of water and 17.5 parts of 10 N-hydrochloric acid were stirred until a smooth slurry was obtained. After cooling the slurry to 0°–5° C., 12.5 parts of 5 N-sodium nitrite were added and the reaction mixture was stirred for 1 hour. The diazonium salt was clarified by filtration and excess nitrous acid was destroyed with a small amount of sulfamic acid. The diazo preparation was then added over a period of 1 hour to a solution of 20 parts of m-benzamido-N,N-dibenzylaniline in 450 parts of acetic acid. The reaction mixture was stirred overnight and the product was isolated by filtration. The wet cake was reslurried several times in a 50:50 acetone-water mixture at room temperature and again at 50° C. to remove traces of a colored impurity. The dye (23 g.) was thus obtained in a chromatographically pure form. It has an absorptivity of 72.2 l./gram/cm. at 505 m$\mu$ (in dimethylacetamide:acetic acid=97:3).

*Analysis.*—Calc'd for $C_{39}H_{32}ON_6$ (percent): C, 78.0; H, 5.3; N, 14.0. Found (percent): C, 78.8; H, 5.4; N, 14.2. Based on the above, the dye has the structure corresponding to 4 - phenylazo - 2'-(N-benzoylamino)-4'-[N,N-bis(benzyl)amino]azobenzene. Deep, red shades are produced on cotton or cotton-polyester blends when dyed or printed with this dye by the procedures illustrated in Examples 4 and 5.

EXAMPLE 3

Preparation of p-nitroaniline→α-naphthylamine→m-benzamido-N,N-dimethylaniline

To 25 parts of water and 30 parts of concentrated hydrochloric acid were added 14 parts of p-nitroaniline. The mixture was heated to 80° C. until a clear solution was obtained. The solution was poured into a mixture of 40 parts of water and 40 parts of ice and then cooled further to 0–5° C. by external means. Twenty-eight parts of 5 N-solid nitrite solution were added rapidly and excess nitrite was maintained for 30 minutes. The excess was then destroyed with sulfamic acid and the diazo solution was clarified by filtration.

A solution of 15 parts of α-napthylamine in 50 parts of acetic acid was then added over a period of 30 minutes to the cold diazo solution. The reaction mass became thick as coupling proceeded; it was diluted with 400 parts of water.

The pH was adjusted to 6.5 with 30% caustic soda, during which adjustment the temperature rose to 40–50° C. The intermediate was isolated by filtration, washed thoroughly with water, and dried; yield, 95%; melting point, 267–72° C.; $\lambda_{max.}$ (dimethyl acetamide:water =4:1), 540 m$\mu$; $\epsilon_{max.}$, 33,900 l./mol/cm.

Fifteen parts of the monoazo intermediate were slurried to a smooth paste in a mixture of 400 parts of acetic acid, 80 parts of water and 6 parts of concentrated hydrochloric acid which had been warmed to 50–60° C. The temperature was then adjusted by external means to about 30° C. and 18 parts of 5 N-sodium nitrite solution were added over a 5 minute period. After maintaining an excess of nitrite for 45 minutes, the excess was destroyed with sulfamic acid. Ice was added to cool the diazo preparation to about 5° C., after which it was stirred at this temperature for 30 minutes and then clarified by filtration.

A solution of 13 parts of m-benzamido-N,N-dimethylaniline in 30 parts of acetic acid was added, with stirring, to the diazo preparation; stirring was continued overnight. The solids were isolated by filtration and washed in turn with isopropanol, water, and again with isopropanol. The solids were recrystallized from dimethylformamide and water (3:1), then washed with the same solvent mixture and, finally, with isopropanol. The resulting needles were chromatographically pure (eluent, acetonitrile:benzene=1:4 on silica coated glass). The dye had an absorptivity of 63.1 l./gram/cm. at 584 m$\mu$ (dimethylacetamide:water=4:1). Based on the above, the dye has the structure corresponding to 2,3-benzo-4-(4'-nitrophenyliazo) - 2' - (N - benzoylamino)-4'-(N,N-dimethylamino)-azobenzene. Deep navy blue shades are produced when cotton or cotton-polyester blends are dyed or printed with this dye by the procedures of Examples 4 and 5.

The following examples illustrate the manner in which the dyes of the present invention can be used to dye or print cellulosics and cellulosic-polyester blends. The uniform coloration reported below for the dyed fabrics refers not only to uniform surface coloration but to uniform coloration throughout the fibers, as confirmed by microscopic examinations of cross-sections of fibers.

EXAMPLE 4

Dyeing of 65/35 "Dacron" polyester cotton blend fabric (a) A padbath was prepared containing:

|  | Grams |
|---|---|
| Red dye paste (15% active ingredient) of Example 2 | 50 |
| Purified vegetable gum thickener | 20 |
| Methoxypolyethylene glycol (molecular weight 350) | 100 |
| Water, to 1 liter. | |

A continuous length of 65/35 "Dacron" polyester/cotton fabric was padded at 60% uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80–100° C., with a hold-up time of one minute, and then through an oven at 200–210° C. with a hold-up time of 1.7 minutes. The hot, dry fabric was cooled to room temperature and rinsed for one minute each in sequence: in water at 20–30° C., in water at 90–95° C., in water containing 1% of an ether-alcohol sulfate detergent at 90–95° C., in water at 90–95° C., and in water at 20–30° C. The material was dreid and then scoured for 5 minutes in perchloroethylene at 50° C. The fabric was uniformly colored in a satisfractory union dyeing of cotton and "Dacron" fibers.

(b) Experiment (a) was repeated except that the following heating procedure was employed.

The padded fabric was passed at a rate of 2 yards per minute between banks of infra-red lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C., where the total contact time was about 90 seconds.

The same procedures were used for 100% mercerized cotton broadcloth, except that the padbath contained 150 grams per liter of methoxypolyethylene glycol (M.W. 350) and the curing temperature was reduced to 180° C. Using the procedure of Example 4(a), modified as described with respect to solvent concentration and curing temperature, a sample of cotton broadcloth was dyed a deep, uniform red shade. After the material had been scoured in aqueous detergent and then in perchloroethylene at 50° C. for 5 minutes as described above, the dyed cloth had a reflectance color value of 10.5.

When the red dye of Example 2 was replaced by 100 grams/liter of a 15% aqueous dispersion of the fifth dye in Table 15 below, a sample of cotton broadcloth was dyed a deep, navy shade which, after having undergone the detergent and perchlorethylene scours described above, had a reflectance color value of 22.

EXAMPLE 5

Printing of 100% cotton fabric

A cotton fabric was padded to about 70% pickup with an aqueous solution containing 200 grams per liter of polyethylene glycol (M.W. 600). The padded fabric was heated at 160° C. for 5 minutes to evaporate water. The fabric was then printed in a pattern with a print paste prepared from:

| | Grams |
|---|---|
| Navy blue paste (15% active ingredient) of Example 3 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachlorethylene at about 50° C. for 5 minutes and dried. The printed areas were strongly dyed.

A similar procedure to that in Example 5 was used to print polyester-cotton blends but the heating temperature was raised to about 200° C. The fastness results of such prints are comparable to those of fabric which is dyed with the same dyes by the procedure of Example 4.

Other examples of water-insoluble dyes that produce deep shades on cotton by the process described above are depicted in Tables 14 and 15.

TABLE 14

| $X_1$ | $X_2$ | $X_3$ | $Z_1$ | $Z_2$ | $Z_3$ | $Z_4$ | R | $R_1$ | Shade |
|---|---|---|---|---|---|---|---|---|---|
| H | H | H | H | Cl | H | H | $C_2H_4OOCC_6H_5$ | $C_2H_4OOCC_6H_5$ | Yellow. |
| $CH_3$ | H | H | H | $C_5H_{11}SO_2$ | H | H | Same as above | Same as above | Do. |
| NHCOOCH$_3$ | H | H | Cl | $NO_2$ | H | H | do | do | Do. |
| NHCOOC$_2$H$_5$ | H | H | Cl | $NO_2$ | H | Cl | do | do | Do. |
| NHCOOC$_2$H$_5$ | H | H | H | $C_2H_4NHCO$ | H | H | do | do | Orange. |
| NHCOOC$_2$H$_5$ | H | H | OCH$_3$ | $C_6H_4NO_2$ | H | H | do | do | Brown. |
| NHCOOC$_2$H$_5$ | H | H | $NO_2$ | $NO_2$ | H | H | do | do | Orange. |
| NHCOOC$_2$H$_5$ | H | H | COCH$_3$ | $NO_2$ | H | H | do | do | Red. |
| NHCOOC$_2$H$_5$ | H | H | CF$_3$ | OCH$_3$ | H | H | do | do | Red. |
| NHCOOC$_2$H$_5$ | H | H | $NO_2$ | CN | H | H | do | do | Red. |
| NHCOOC$_2$H$_5$ | H | H | H | $NO_2$ | H | H | do | do | Red. |
| NHCOOC$_2$H$_5$ | H | H | $CO_2C_2H_5$ | CH$_3$CO | H | H | do | do | Bluish red. |
| NHCOOCH$_3$ | H | H | Cl | $NO_2$ | H | H | do | do | Orange. |
| NHCOOCH$_3$ | H | H | Cl | $NO_2$ | H | Cl | do | do | Do. |
| NHCOOCH$_3$ | H | H | $NO_2$ | $NO_2$ | H | SO$_2$C$_6$H$_5$ | do | do | Navy blue. |
| NHCOC$_6$H$_5$ | H | OCH$_3$ | $NO_2$ | $NO_2$ | H | Cl | $C_2H_4OCH_3$ | $C_2H_4OCH_3$ | Blue. |
| NHCOOCH$_3$ | H | OCH$_3$ | CN | $NO_2$ | H | Cl | $C_2H_4OCC_6H_5$ | $C_2H_4OCC_6H_5$ | Do. |
| NHCOOCH$_3$ | H | OC$_2$H$_5$ | $NO_2$ | $NO_2$ | H | Br | $C_2H_4OOCOC_2H_5$ | $C_2H_4OOCOC_2H_5$ | Do. |

TABLE 14—Continued

| $X_1$ | $X_2$ | $X_3$ | $Z_1$ | $Z_2$ | $Z_3$ | $Z_4$ | R | $R_1$ | Shade |
|---|---|---|---|---|---|---|---|---|---|
| NHCOCH₃ | H | OCH₃ | NO₂ | CH₃ | H | H | C₂H₄OO̤CC₆H₅ | C₂H₄OO̤CC₆H₅ | Violet. |
| H | H | H | H | C₆H₅CO | H | H | | C₂H₄CN | Yellow. |
| NHCOCH₃ | H | H | H | CH₃SO₂ | H | H | | C₂H₄CN | Orange. |
| NHCOC₆H₅ | H | H | Cl | NO₂ | H | Cl | | C₂H₄CN | Brown. |
| H | H | H | H | C₆H₅CONH | H | H | | C₂H₄OO̤CC₆H₅ | Yellow. |
| H | H | H | H | H | [(C₄H₉)₂NSO₂–⌬] | H | C₂H₄CONHC₆H₅ | C₂H₄CONHC₆H₅ | Orange. |
| NHCOCH₃ | H | H | CN | NO₂ | H | H | | C₂H₄CONH–⌬–CH₃ | Red. |
| (–CH=CH–CH=CH–) | H | H | H | Br | H | H | | C₂H₄OO̤CC₆H₅ | Orange. |
| OCH₃ | H | H | C₆H₅CO | Cl | CH₃–⌬–SO₂ | H | C₂H₄OO̤CC₆H₅ Same as above | | Red. |

TABLE 15

| $X_1$ | $Z_1$ | $Z_2$ | $Z_3$ | $Y_1$ | $Y_2$ | $Y_3$ | R | $R_1$ | Shade |
|---|---|---|---|---|---|---|---|---|---|
| H | H | NO₂ | H | (–CH=CH–CH=CH–) | H | C₂H₄OO̤CC₆H₅ | Same as above | Violet. |
| CH₃ | Cl | NO₂ | H | OCH₃ | H | OCH₃ | | C₂H₄OO̤CC₆H₅ | Navy blue. |
| CH₃ | Cl | NO₂ | H | (–CH=CH–CH=CH–) | OCH₃ | | Do. |
| NHCOCH₃ | H | NO₂ | H | OCH₃ | H | OCH₃ | | | Do. |
| NHCOC₆H₅ | H | NO₂ | H | (–CH=CH–CH=CH–) | OCH₃ | C₂H₅ | C₂H₅ | Do. |
| NHCOCH₃ | H | NO₂ | H | (–CH=CH–CH=CH–) | H | C₂H₅ | C₂H₅ | Do. |
| H | H | H | NHCOC₂H₅ | H | SCH₃ | H | C₂H₄CN | C₂H₄OO̤CC₆H₅ | Bluish red. |
| CH₃ | Cl | H | H | H | H | H | | C₂H₄OO̤CC₆H₅ | Violet. |
| NHCOC₆H₅ | Cl | H | COC₆H₅ | OCH₃ | H | OCH₃ | CH₃ | C₂H₅ | Do. |
| NHCOCH₃ | Cl | CH₃ | H | H | OCH₃ | H | CH₃ | CH₃ | Do. |
| NHCO₂CH₃ | Cl | NO₂ | H | OCH₃ | H | OCH₃ | C₂H₄CN | C₂H₅ | Navy blue. |
| NHCOCHOCH₃⏐CH₃ | Cl | NO₂ | H | (–CH=CH–CH=CH–) | H | CH₃ | C₂H₅ | Blue. |
| NHCOCH₃ | H | NO₂ | H | (–CH=CH–CH=CH–) | H | CH₃ | C₂H₅ | Navy blue. |
| NHCOC₆H₅ | | H | H | CH₃ | H | CH₃ | C₂H₄CONHC₆H₅ | C₂H₄CONHC₆H₅ | Red. |

NOTE.—$X_1$ is H throughout; $X_4$ is H throughout except where *(OCH₃ here); $Z_4$ is H throughout except where *(Cl here).

The embodiments of the invention in which an exclusive property or privilege is claimed are defined as follows:

1. Yellow to navy blue, uniformly dyed, water swellable cellulose fibers or water swellable cellulose fibers blended with synthetic fibers, said fibers being fast to washing, drycleaning and crocking and having a reflectance color value (S') of at least about 2 after one thorough scour in aqueous detergent at 90–100° C, and one thorough scour in perchloroethylene at 50° C, wherein said fibers the dye comprises the azo disperse dye having the formula

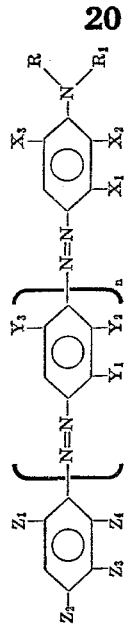

wherein
R is H, R₂, benzyl,

C₂H₄OR₃, C₂H₄OC̤R₃, C₂H₄OC̤R₃, C₂H₄OC̤NHR₃, C₂H₄OC̤NR₃, C₂H₄CN

C₂H₄C̤NH₂, C₂H₄C̤NHR₃, C₂H₄C̤NHR₃, C₂H₄C̤NHR₃, C₂H₄OR₃

C₂H₄C̤N(R₂)R₃, C₂H₄C̤N(R₂)₂, C₂H₄OR₃

C₂H₄OR₂ or C₂H₄OR₃

$R_1$ is phenyl or any member of the group recited for R;

$X_1$ and $X_2$ jointly are —CH=CH—CH=CH— or —CH=CH—CH=CH— which has been substituted with $R_2$, $OR_2$, Cl, Br or $SO_2N(R_2)_2$, or $X_1$ is H, Cl, $R_2$,

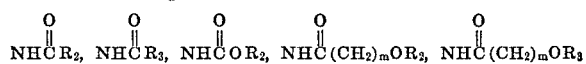

$OR_2$ or $SR_2$, and $X_2$ is H, $R_2$, $OR_2$, $SR_2$ or Cl;

$X_3$ is any member of the group recited for $X_2$;

$Z_1$ is H, $R_2$, $NO_2$, Cl, Br, CN, $SO_3N(R_2)_2$,

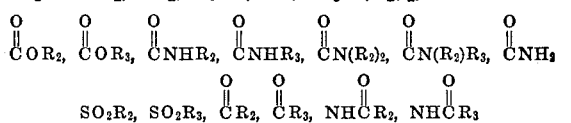

$OR_2$, $OR_3$, $SR_2$ or $CF_3$;

$Z_2$ is any member of the group recited for $Z_1$;

$Z_3$ and $Z_4$ jointly are —CH=CH—CH=CH— or —CH=CH—CH=CH— which has been substituted with $R_2$, $OR_2$, Cl, Br or $SO_2N(R_2)_2$, or $Z_3$ is any member of the group recited for $Z_1$, and $Z_4$ is any member of the group recited for $Z_1$;

$Y_1$ and $Y_2$ jointly are —CH=CH—CH=CH—, subject to the provision that when $Z_1$, $Z_2$, $Z_3$ or $Z_4$ is $NO_2$ and R and $R_1$ are $R_2$, then $X_1$ is not $R_2$, and when $Z_1$, $Z_2$, $Z_3$ or $Z_4$ is $NO_2$ and $X_1$ is

or

then R is H, $R_2$ or $C_2H_4CN$ and $R_1$ is H, $R_2$, $C_2H_4CN$ or phenyl, or $Y_1$ is H, $CH_3$, $C_2H_5$, $OCH_3$, $OC_2H_5$, $SCH_3$, $SC_2H_5$ or Cl, and $Y_2$ is any member of the group recited for $Y_1$;

$Y_3$ is any member of the group recited for $Y_1$;

$R_2$ is $C_{1-8}$ alkyl;

$R_3$ is phenyl or phenyl with 1–2 substitutents selected from $C_{1-4}$ alkyl, $C_{1-4}$ alkoxy, $NO_2$ and Cl;

$n$ is 0 or 1;

$m$ is 1 or 2;

subject to the proviso that when R and $R_1$ are

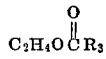

and $n$ is 1, then at least one of $Z_1$, $Z_2$, $Z_3$ and $Z_4$ is $NO_2$, and subject to the further proviso that there are present at least four aromatic rings.

2. The fibers of claim 1, the fibers being cotton.

3. The fibers of claim 1, the fibers being a blend or mixture of cotton and polyester fibers.

4. The fibers of claim 1 wherein the dye has the structure

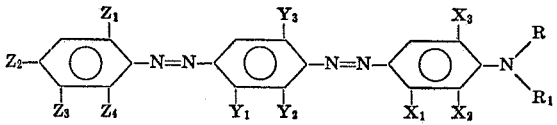

wherein all R, X, Y and Z substituents are as defined in claim 1.

5. The fibers of claim 1 wherein the dye has the structure wherein all R, X, Y and Z substituents are as defined in claim 1.

References Cited

UNITED STATES PATENTS

| | | | |
|---|---|---|---|
| 2,828,180 | 3/1958 | Sertorio | 8—174 X |
| 3,254,073 | 5/1966 | Wallace et al. | 8—41 C |
| 3,522,234 | 7/1970 | Groebke | 8—41 C |
| 2,120,552 | 6/1938 | Ellis et al. | 8—93 X |

FOREIGN PATENTS

| | | | |
|---|---|---|---|
| 1,071,074 | 6/1967 | Great Britain | 8—21 C |
| 1,112,279 | 5/1968 | Great Britain | 8—21 C |
| 1.056,358 | 1/1967 | Great Britain. | |

OTHER REFERENCES

WAS White, Amer. Dyestuff Reporter, July 31, 1967, pp. P591–P597.

Cockett et al., "Dyeing of Cellulose Fibers & Related Processes," p. 291, publ. by Academic Press, New York City (1961).

C. C. Wilcock et al., "Whittaker's Dyeing With Coal-Tar Dyestuffs," 6th ed., 1964, p. 244.

L. Peters et al., J. Soc. Dyers/Colourists, 73, 23 (1967).

GEORGE F. LESMES, Primary Examiner

T. J. HERBERT, Jr., Assistant Examiner

U.S. Cl. X.R.

8—41 C; 54.2